United States Patent [19]

Lundgren

[11] 4,311,058
[45] Jan. 19, 1982

[54] DEVICE FOR TRANSFORMING ROTATIONAL MOVEMENT INTO LINEAR MOVEMENT OR THE REVERSE

[75] Inventor: Bengt Lundgren, Lerum, Sweden

[73] Assignee: SKF Nova AB, Sweden

[21] Appl. No.: 97,944

[22] Filed: Nov. 27, 1979

[30] Foreign Application Priority Data

Jan. 26, 1979 [SE] Sweden ............................ 7900697

[51] Int. Cl.³ .............................................. F16H 21/16
[52] U.S. Cl. ............................................ 74/89; 74/25
[58] Field of Search ............ 74/25, 89, 89.15, 424.8 R

[56] References Cited

U.S. PATENT DOCUMENTS

| | | | |
|---|---|---|---|
| 2,940,322 | 6/1960 | Uhing | 74/25 |
| 4,008,929 | 2/1977 | Oirik | 74/25 |
| 4,141,255 | 2/1979 | Nilsson | 74/25 |
| 4,222,619 | 9/1980 | Nilsson | 74/25 X |

FOREIGN PATENT DOCUMENTS 2709006  9/1978  Fed. Rep. of Germany .......... 74/25

*Primary Examiner*—Lawrence J. Staab
*Attorney, Agent, or Firm*—Eugene E. Renz, Jr.

[57] ABSTRACT

The invention relates to a device for transforming rotational movement into linear movement or the reverse. The device comprises a cylindrical shaft and at least one support displaceable along the shaft for supporting at least one bearing with a ring which surrounds the shaft and is rotatable relative to the support. The bore diameter of the ring is larger than the shaft diameter and the ring has an inclined position in relation to the shaft and is pressed into contacting the shaft. In order to ensure simple manufacturing and assembling of the device, the support is provided with an opening for the bearing, which opening extends across the support and has a constant cross section profile along the entire extension, mainly corresponding to the axial bearing profile.

7 Claims, 6 Drawing Figures

DEVICE FOR TRANSFORMING ROTATIONAL MOVEMENT INTO LINEAR MOVEMENT OR THE REVERSE

BACKGROUND OF THE INVENTION AND SUMMARY OF THE PRESENT INVENTION

The present invention relates to a device of the kind described in the introduction of the accompanying claim 1.

Such devices are used in many different connections for example in actuators and transport members. The devices are primarily used in the embodiment in which rotation of the shaft or the surrounding support causes displacement of the surrounding support along the shaft or the shaft through the support, respectively. It is known to adjust the speed of displacement either by adjusting the inclination angle of the rings relative to the shaft or by adjusting the rotational speed of the shaft or the support. The invention is primarily but not exclusively intended for devices of the last mentioned kind.

Generally, each device has to comprise at least three rings which are pressed against the shaft in order to obtain force equilibrium in the most suitable way. In embodiments with three rings, two of the rings are pressed in one direction against the shaft, and the third, which is usually situated between the two other rings, is pressed in the opposite direction. The bearings comprising the rings are usually mounted in bearing housings or similar members, which are displaceable in the support in a direction across the shaft and spring loaded so that the rings are urged with a pre-stress against the shaft. A complete device thus comprises a great number of parts, each of which having a relatively complicated shape and therefore being expensive to manufacture with necessary precision. The device is thus expensive and also complicated to mount.

The purpose of the present invention is to bring about a device consisting of parts which are easy to manufacture and to handle, which means that the device can be produced inexpensively and be easily mounted. According to the invention this is obtained by giving the device the characteristics which appear from the accompanying claim 1.

A device according to the invention may consist of but a few parts, which can be produced quickly and easily and with a good precision.

BRIEF DESCRIPTION OF THE DRAWINGS

In the following the invention is further described with reference to the attached drawing, in which.

DESCRIPTION OF THE PREFERRED EMBODIMENTS

Figure 1:
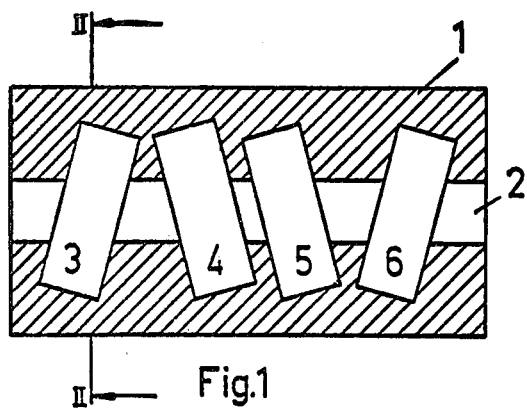
FIG. 1 shows a longitudinal section of a support in a device according to an embodiment of the invention.
Figure 2:
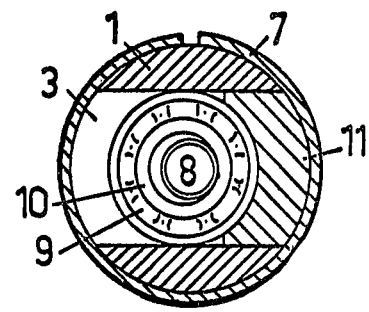
FIG. 2 shows a cross section according to II—II in FIG. 1 of a device provided with a support according to FIG. 1.

The support shown in FIG. 1 consists of a preferably massive body 1, through which a longitudinal bore 2 is extending. A shaft, not shown, with a cylindrical envelope surface is extending through the bore. The support is, together with the elements attached to it, displaceable along the shaft. A number of openings 3, 4, 5, 6 are provided across the support. A bearing with a ring which surrounds the shaft and is rotatable in relation to the support is intended to be inserted in each opening. The bore diameter of the ring is larger than the shaft diameter in order to allow a skewed position of the ring in relation to the shaft in accordance with the inclined position of the opening, as appears from the figure. The openings have a constant cross section profile generally corresponding to the axial profiles of those bearings which are intended to be inserted in the respective openings. The support is provided with means for pressing the bearing rings against the shaft provided in the bore 2. An example of a pressing device is shown in FIG. 2. The body of the support 1 has a cylindrical shape and is surrounded by a cylindrical spring 7, which is pre-stressed against the envelope surface of the body 1. A shaft 8 is inserted in the longitudinal bore. A bearing 9 in the shape of a rolling bearing with an outer ring which does not rotate in the body 1 and an inner ring 10 which rotates in relation to the outer ring and which contacts the shaft 8 is inserted in the opening 3 (and, of course, also in the other openings). The bearing is displaceable in the opening 3 and the ring 10 is pressed against the shaft 8 by a block 11 which is inserted in and displaceable in the opening 3. The block is in unloaded state projecting out of the opening 3 from the envelope surface of the body 1 and is pressed against the outer ring of the bearing by the force of the spring 7. The block may be made of an elastically compressible material, so that it will adapt its shape to the surrounding elements under pressure. The bearings inserted in the openings 3 and 6 which are inclined in the same direction are pressed in the same direction, whereas the bearings inserted in the openings 4 and 5, which are inclined in the opposite direction, are pressed in the opposite direction, so that a force equilibrium is obtained. When for example the shaft 8 is rotated, the support is displaced along the shaft if it is prevented from rotating. The support may possibly be rotated, whereby the shaft is displaced axially. It is also possible to move one of the elements axially, whereby the other element is forced to rotate.

Figure 3:
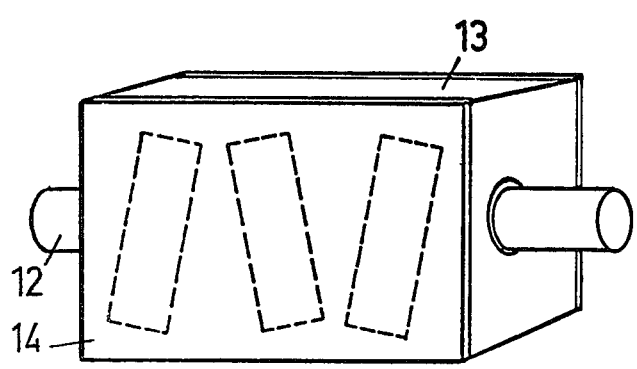
FIG. 3 shows a side view of a device according to another embodiment of the invention.
Figure 4:
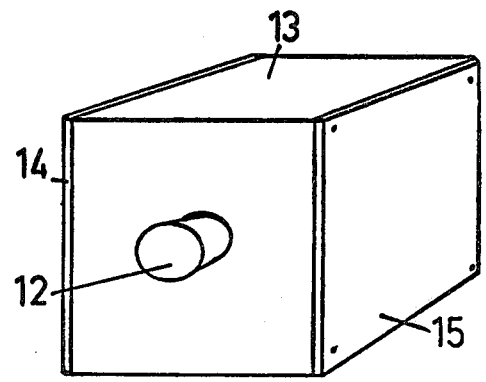
FIG. 4 shows an end view of such a device.

The FIGS. 3 and 4 show a side view in perspective and an end view of a device according to another embodiment of the invention. A shaft 12 is surrounded by a support 13, in which openings, marked by dashed lines in FIG. 3, are provided. Bearings are arranged in the openings in the same manner as described in connection to the FIGS. 1 and 2. The sides of the support 13 are covered by plates 14, 15, which close the openings in the support wall and press the bearings which are situated in the openings radially so that their inner rings are urged against the shaft. The plates may be fastened by screws or the like. The support 13 has such a shape that its cross section area has a constant outline in planes parallel to the shaft and perpendicular to the extension of the openings, i.e. in planes which are generally parallel to the plane of the paper in FIG. 3. Supports with such a shape can easily be produced by e.g. extrusion of aluminum blanks, whereby the openings can be provided directly at the extrusion procedure. The extruded bar can be cut into desired lengths corresponding to the width of the complete supports, and be provided with a bore for the shaft 12 by a boring operation.

Figure 5:
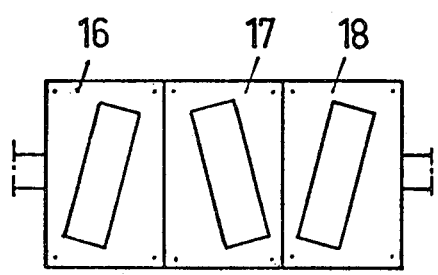
FIGS. 5 and 6 show the principles of further embodiments of the invention.

Instead of providing a support with a plurality of openings, a number of supports with only one opening each can be produced and connected into a unit, as shown in FIG. 5. The production of the supports may be carried out in the same manner as described in connection to FIGS. 3 and 4, and the supports 16, 17, 18 can be kept together in a suitable way, for example by axial bolt joints, gluing, welding or by being fixed in a common freeze.

As mentioned above, devices of the kind in question comprise at least three rings, which contact the shaft. Each support may thus contain three, four or more openings for rings. If a plurality of supports are used together, each support may contain one or possibly two openings.

Figure 6:
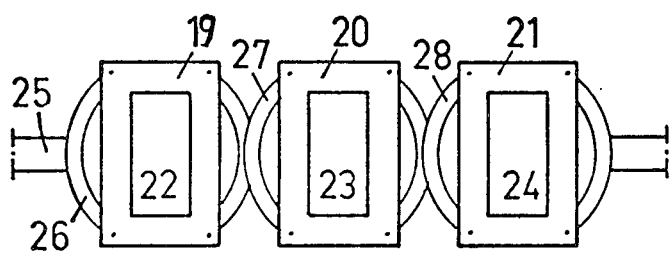

FIG. 6 shows a sketch of the principle of using the invention in a device in which the inclination of the rings in relation to the shaft may be varied. Therewith the device comprises a number, three in the embodiment shown, of supports 19, 20, 21, each provided with one opening 22, 23 and 24, respectively, for a bearing with a ring which is pressed against the shaft 25 surrounded by the supports. Each support is in a manner known per se, see e.g. Swedish published patent application No. 7609795-5, tiltable around an axis perpendicular to the shaft 25 and passing through the point of contact between the shaft 25 and the ring provided in the respective support, and the supports are mutually connected by e.g. gear segments 26, 27, 28.

Also other embodiments of the invention than the ones above described are possible. The outer shape of the support does not have to be cylindrical or have a constant outline. The rings contacting the shaft do not have to be parts of rolling bearings but may for example be slidingly arranged in the respective supports. The member 7 surrounding the support according to FIG. 2 does not have to be resilient but may be rigid if for example the members 11 are resilient. Instead of members 7, 14, 15 which completely cover the support for prestressing all the rings, a separate pre-stressing member may be provided for each opening, e.g. in embodiments of the invention similar to that outlined in connection to FIG. 6.

I claim:

1. A device for transforming rotational movement into linear movement or vice versa comprising a cylindrical shaft member and a support having a bore therein through which the shaft extends of larger diameter than the shaft, said support displaceable axially relative to the shaft, a plurality of openings in said support disposed angularly relative to the shaft, a bearing mounted in each opening of said support, each bearing having a circular cylindrical outer configuration and including an outer ring member and an inner ring member rotatable relative to said support, the bore diameter of said inner bearing ring member being larger than the shaft diameter and the axis of the bearing being inclined relative to the shaft, means for moving each bearing in its opening so that the inner ring member contacts said shaft, said openings extending through said support transversely to said shaft and being of a predetermined constant uniform cross section for their entire extent, the cross section of each of said openings corresponding to the profile of its respective outer bearing ring member for ease of assembly therein.

2. A device according to claim 1, characterized by that it comprises a support (1, 13) with at least three openings.

3. A device according to claim 1, characterized by that said support including a plurality of interconnected support members.

4. A device according to claim 3, characterized by that it comprises at least three support members (16, 17, 18 and 19, 20, 21 respectively) each having one opening.

5. A device according to claim 1 characterized by that the cross section of the support (13) has a constnt outline in planes parallel to the shaft and perpendicular to the extension of the opening.

6. A device according to claim 1, characterized by that the support (1) has the shape of a cylinder which is coaxial with the surrounded shaft.

7. A device as claimed in claim 1 wherein said support is a unitary one-piece element.

* * * * *